June 10, 1969   D. D. EDEN   3,449,583
PHOTOCONDUCTIVE ELECTRO-OPTIC IMAGE INTENSIFIER
UTILIZING POLARIZED LIGHT
Filed Feb. 24, 1966

DAYTON D. EDEN
INVENTOR

Richards Harris & Hubbard

ATTORNEY 3,449,583
PHOTOCONDUCTIVE ELECTRO-OPTIC IMAGE INTENSIFIER UTILIZING POLARIZED LIGHT
Dayton D. Eden, Dallas, Tex., assignor to Texas Instruments Incorporated, Dallas, Tex., a corporation of Delaware
Filed Feb. 24, 1966, Ser. No. 529,845
Int. Cl. H01j 31/50
U.S. Cl. 250—213     9 Claims

ABSTRACT OF THE DISCLOSURE

Disclosed is a photoconductive electro-optic transducer between two glass panels being made up of a sandwich of a front electrode; an electrro-optic crystal; a mirror surface, reflective from one side, and nonreflective from the other; a photoconductive panel; and a back electrode, and operable such the when ambient light is directed through a polarizer onto the front side of the transducer and an image is directed onto the back side, the image will be reproduced and amplified on the front due to variations in the electro-optic material which change the polarization of the incident ambient light.

---

This invention relates to a reflective image intensifier, and more particularly to a system in which a photoconductive structure locally alters the birefringence of an electro-optic panel to change the reflectivity to ambient light on one side of the intensifier in dependence upon patterns in the light field incident upon the opposite side.

Solid-state image intensifiers heretofore have been provided wherein an amplified image is produced on or within an electro-luminescent panel which is locally activated by electric fields perpendicular to the panel, which fields are locally variable. The field intensity at any localized spot across the face is proportional to the light intensity striking the corresponding spot on a photoconductor panel mounted back of the electro-luminescent panel.

Since a photoconductor panel changes resistance locally in proportion to the light intensity striking it, a corresponding change is produced in the field intensity across the electro-luminescent panel. This results in corresponding variations in the light intensity emitted from different parts of the electro-luminescent panel.

In contrast to such systems, the present invention is directed to a system in which a flat electro-optic crystal of unique crystallographic orientation is employed, together with a highly reflective film deposited on the back of the crystal. The film will reflect ambient light in dependence upon local changes in the resistance produced in a photoconductive panel back of the film by changes in incident light intensity striking such panel.

In a more specific aspect, a photoconductive electro-optic transducer is provided in which a substantially planar electro-optic body has a transparent conductive front layer and a conductive reflector contacting the back of the electro-optic body. A photoconductive structure contacts the back of the reflector. A voltage source is connected between the transparent layer and the photoconductive structure. As a result, light impinging the photoconductive layer locally alters the voltage across the electro-optic layer and hence also its birefringence for varying the reflectivity of the transducer to ambient light corresponding with variations in incident light at the back of the transducer.

Figure 1:
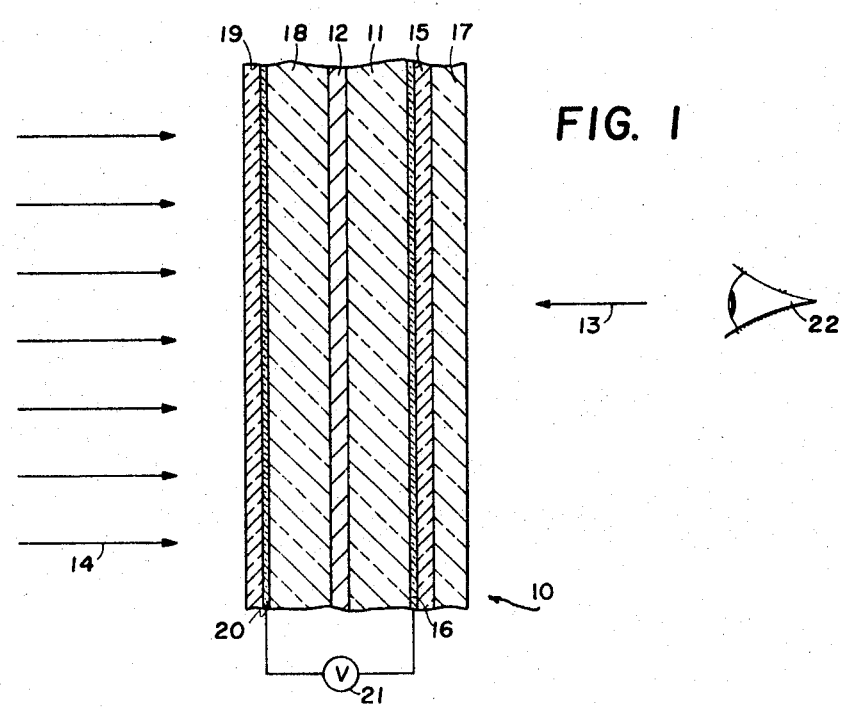
Figure 3:
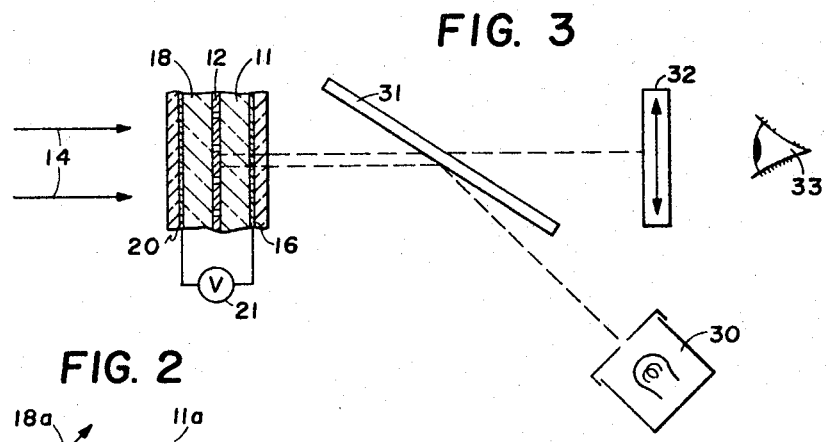
Figure 2:
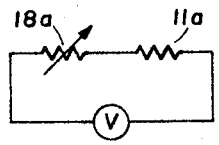

For a more complete understanding of the present invention and for further objects and advantages thereof, reference may now be had to the following description taken in conjunction with the accompanying drawings in which:

FIGURE 1 is a sectional view of a portion of an intensifier;
FIGURE 2 is an electrical equivalent of a portion of FIGURE 1; and
FIGURE 3 illustrates a further embodiment of the invention.

Referring now to FIGURE 1, a structure embodying the present invention includes an intensifier section 10 formed with a flat electro-optic crystal 11. A highly reflective film 12 is located in contact with the back face of crystal 11. The film 12 reflects ambient light arriving in the direction of arrow 13, and does not reflect incident light coming from the direction of arrows 14. The film 12 is a moderately good conductor perpendicular to its plane and a poor conductor parallel to its plane.

A thin glass panel 15 having a transparent conducting film 16 thereon is placed in contact with the front face of the electro-optic crystal 11. A polarizing sheet 17 is located over the front face of the panel 15.

A panel 18 of photoconductive material, sensitive to the wavelengths of incident light forming an incoming image, is located in contact with the non-reflecting side of the reflector 12. The sandwich is completed by applying to the back face of the photoconductive panel 18 a transparent glass panel 19 having a conductive film 20 on the inside face thereof. A voltage source 21 is then connected to the two films 16 and 20.

In operation of the system, when light strikes a spot on the surface of the photoconductive sheet 18, the resistance of the local volume of the photoconductive sheet on which the light falls will decrease. Thus, the voltage drop there across will decrease. This will cause the voltage drop across the adjacent volume of electro-optic crystal 11 to increase and will change the state of polarization of the ambient light as it passes through that section of the electro-optic crystal and is reflected back to an observer 22. The electro-optic material, its thickness, and the bias voltage from source 21 may be selected so that all ambient light is reflected to the observer 22 when the exposed surface of the photoconductive sheet 18 is dark. In this case, when a pencil of light strikes a spot on the back surface, a corresponding spot on the front surface will appear dark. Of course, the reverse situation would follow. More particularly, parameters may be selected initially so that the front face appears dark and does not reflect any ambient light. In this case, a spot of light directed onto the photoconductive surface will cause the corresponding volume of the electro-optic crystal to change the state of polarization of ambient light sufficiently to allow it to be reflected back through the polarizer and will appear as a white spot on a black field.

It will now be seen that an image focused on the back surface of the photoconductive sheet 18 will be reproduced by selective reflection or ambient light through the polarizer and the electro-optic crystal 11 from the front surface of the reflector layer 12.

FIGURE 2 is an electrical analog of the structure of FIGURE 1. The resistance 18a represents the variable resistance of the layer 18 as produced by incident light. The resistance 11a represents the resistance across the electro-optic crystal 11. When the resistance 18a is varied, the voltage drop across resistance 11a changes. The corresponding change in the electric field across the electro-optic material of FIGURE 1 changes the polarization of light passing therethrough and thus provides a mechanism for control of the reflectivity of the front face of the intensifier 10.

By way of example, the elements of the intensifier 10 may be formed of the following materials.

The electro-optic crystal 11 may be of potassium dihydrogen phosphate (KDP), potassium dideuterium phosphate (KD*P), or hexamethylene tetramine (HMTA).

A reflecting layer 12 of aluminum or silver deposited on the back of the electro-optic crystal 11, if of sufficient thickness to serve as a reflector, will have appreciable conductivity in the plane thereof. Thus, as will be described, a matrix of mirrors will be preferred.

The glass substrates 15 and 19 are non-conductive, with extremely thin films of transparent conductors thereon, such as of tin oxide.

The photoconductive layer 18 may be of material such as cadmium sulfide (CdS) or cadmium selenide (CdSe), both suitably doped.

Where the electro-optic crystal 11 is made of KD*P, having known values of resistivity of about $10^{10}$ ohm-centimeters, the photoconductive layer will be of such material that when completely dark, it will have resistivity of one to two orders of magnitude higher than the resistivity of the electro-optic crystal. When illuminated, it will have resistivity of one to two orders lower than the resistivity of the electro-optic crystal.

With the foregoing understanding of the invention, it is to be noted that for some purposes a preferred arrangement will involve a polarizer and an analyzer other than the single layer 17 of FIGURE 1. This will be desirable in order to direct ambient light onto the electro-optic crystal while permitting the face of the intensifier to be viewed. This is particularly true for materials known to have a narrow viewing cone. Such a system is illustrated in FIGURE 3. In this system, the intensifier sandwich comprises the electro-optic crystal 11, reflector layer 12, and the photoconductive layer 18, positioned between the electrodes 16 and 20. The polarizer 17 has been removed and in its place, light from a source 30 is directed onto the face of the intensifier by means of a Brewster's angle polarizer 31. Reflected light passes through the polarizer 31 and through an analyzer 32 to a viewer 33. This permits observation of the intensifier while permitting illumination thereof. Any image viewed through the analyzer 32 will be representative of the image incident upon the photoconductive layer 18 due to the incident light 14. Such arrangement will be preferred on any system where the electro-optic crystal is of material other than materials that have cubic crystal structure.

In this embodiment, the reflector film 12 is discontinuous, being formed as small reflecting islands, each electrically isolated from the other so far as sheet conduction therein is concerned. Thus, changes in polarization of light passing through the electro-optic layer may be localized to correspond with the light incident upon the photoconductive layer 18. In this embodiment, in order to isolate the photoconductive layer from light falling on the electro-optic material, an opaque layer (not shown) may be included between the back of the mirrors 12 and the photoconductive layer 18. This opaque layer may be of material having resistivity of about the same order of magnitude as the electro-optic layer 11, i.e., about $10^{10}$ ohm-centimeters. One material having the above character is formed from a spray paint manufactured by Minnesota Mining & Manufacturing Co., of Minneapolis, Minnesota, and identified as Velvet Coating 101–C10.

Having described the invention in connection with certain specific embodiments thereof, it is to be understood that further modifications may now suggest themselves to those skilled in the art and it is intended to cover such modifications as fall within the scope of the appended claims.

What is claimed is:

1. A photoconductive electro-optic transducer which comprises:
    (a) a substantially planar electro-optic body having front and back sides,
    (b) a first transparent conductive layer on said front side of said electro-optic body,
    (c) means for polarizing ambient light incident thereupon to illuminate said front side of said electro-optic body,
    (d) an electrically conductive reflector film contacting said back side of said electro-optic body, and
    (e) a photoconductive panel having a front and back side, said front side contacting said reflector film,
    (f) a second transparent conductive layer in contact with said back side of said photoconductive panel, whereby when a voltage source is connected between said first and second transparent conductive layers and light is directed onto said photoconductive panel, the voltage drop and the resulting birefringence across regions of said electro-optic body are locally altered, thereby varying the amount of ambient light reflected from said transducer in dependence upon the light directed onto the back side of said photoconductive panel.

2. The combination set forth in claim 1 wherein said electro-optic body is of cubic crystalline material.

3. The combination of claim 2 wherein said means for polarizing ambient light is a polarizing sheet.

4. The combination set forth in claim 1 wherein ambient light reaches said transducer by way of a Brewster's angle polarizer and an analyzer is provided for viewing said transducer.

5. A photoconductive electro-optic transducer which comprises:
    (a) a substantially planar electro-optic body having front and back sides,
    (b) a first transparent conductive layer contacting said front side of said electro-optic body,
    (c) means for polarizing ambient light incident thereupon to illuminate said front of said electro-optic body,
    (d) a matrix of electrically conductive mirrors insulated one from another and contacting said back of said electro-optic body,
    (e) a photoconductive panel having front and back sides, said front side being electrically coupled to said matrix of mirrors, and
    (f) a second transparent conductive layer contacting said back face of said photoconductive panel, whereby when a voltage source is connected between said first and second transparent conductive layers and light is directed onto said photoconductive panel the voltage drop and birefringence are locally altered across regions of said electro-optic body to vary the reflectivity of said transducer to ambient light at the front of said transducer corresponding with the incident light on said photoconductive panel.

6. The combination of claim 5 wherein said matrix of mirrors is a plurality of thin film conductors reflective on the side contacting said back side of said electro-optic body and non-reflective on the side to which said back side of said photoconductive panel is coupled.

7. An article of manufacture which comprises:
    (a) a substantially planar electro-optic body,
    (b) a transparent conductive layer contacting the front of said body,
    (c) polarizing means through which ambient light must pass to illuminate the face of said article,
    (d) a matrix of conductive mirrors electrically isolated one from another and electrically coupled to the back of said electro-optic body,
    (e) a photoconductive layer conductively coupled over one face to the backs of said mirrors, and
    (f) a transparent conductive layer contacting the back of said photoconductive layer, whereby voltage from a source connected between both transparent layers will vary in opposite senses in dependence upon light directed onto said photoconductive layer locally to alter the birefringence of said electro-optic body and thereby to vary the reflectivity of said article to ambient light at the front of said article to correspond with the incident light on said photoconductive layer.

8. The article of manufacture set forth in claim 7 wherein said mirrors are thin film conductors reflective on the face confronting said electro-optic body and non-reflective on the face confronting said photoconductive layer.

9. The article of manufacture set forth in claim 7 in which said electro-optic body is of a material of the class consisting of potassium dihydrogen phosphate, potassium dideuterium phosphate, and hexamethylene tetramine.

References Cited
UNITED STATES PATENTS

| 2,276,360 | 3/1942 | Von Ardenne | 350—150 |
| 2,892,380 | 6/1959 | Baumann et al. | 250—213 |

ARCHIE R. BORCHELT, *Primary Examiner.*

T. N. GRIGSBY, *Assistant Examiner.*

U.S. Cl. X.R.

250—217, 225; 350—150